(12) United States Patent
Zhao et al.

(10) Patent No.: US 8,055,241 B2
(45) Date of Patent: Nov. 8, 2011

(54) SYSTEM, APPARATUS AND METHOD FOR CONTENT SCREENING

(75) Inventors: Qin Zhao, Shenzhen (CN); Yongsheng Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1068 days.

(21) Appl. No.: 11/775,653

(22) Filed: Jul. 10, 2007

(65) Prior Publication Data

US 2008/0014974 A1    Jan. 17, 2008

(30) Foreign Application Priority Data

Jul. 11, 2006 (CN) .......................... 2006 1 0100874
Nov. 10, 2006 (CN) .......................... 2006 1 0138277

(51) Int. Cl.
*H04L 12/58* (2006.01)
*H04M 1/66* (2006.01)
*G06F 11/00* (2006.01)

(52) U.S. Cl. ..................... 455/412.1; 455/410; 455/411; 726/22; 726/23; 726/24

(58) Field of Classification Search ....... 455/410–412.2; 709/206
See application file for complete search history.

(56) References Cited

U.S. PATENT DOCUMENTS

| | | | |
|---|---|---|---|
| 6,233,618 B1 | 5/2001 | Shannon | |
| 2002/0178381 A1 | 11/2002 | Lee et al. | |
| 2003/0115253 A1 * | 6/2003 | Barbir et al. | 709/202 |
| 2003/0178381 A1 | 9/2003 | Liang | |
| 2003/0182420 A1 | 9/2003 | Jones et al. | |
| 2004/0128355 A1 * | 7/2004 | Chao et al. | 709/206 |
| 2004/0203581 A1 | 10/2004 | Sharon et al. | |
| 2004/0203589 A1 * | 10/2004 | Wang et al. | 455/410 |
| 2004/0235503 A1 | 11/2004 | Koponen et al. | |
| 2005/0005160 A1 * | 1/2005 | Bates et al. | 713/200 |
| 2005/0060643 A1 * | 3/2005 | Glass et al. | 715/501.1 |

FOREIGN PATENT DOCUMENTS

| | | |
|---|---|---|
| CN | 1455574 A | 11/2003 |
| CN | 1588879 | 3/2005 |
| WO | WO 2004/008701 A1 | 1/2004 |
| WO | WO 2004/032451 A1 | 4/2004 |

(Continued)

OTHER PUBLICATIONS

State Intellectual Property Office of the People's Republic of China, Examination Report in Chinese Patent Applicatio No. 200780000344.0 (May 12, 2010).

(Continued)

*Primary Examiner* — Patrick Edouard
*Assistant Examiner* — Huy C Ho
(74) *Attorney, Agent, or Firm* — Slater & Matsil, L.L.P.

(57) ABSTRACT

Embodiments of the present invention provide a content screening system, a content screening apparatus and a method for content screening. The content screening apparatus includes a content screening server for receiving a message containing content to be screened, screening the content and sending a screening result. The content screening system includes the content screening apparatus and a message receiver, or includes the content screening apparatus and a content screening requester. The method for content screening includes: screening the content to be screened which are sent to the message receiver or from the content screening requester, and sending a screening result to the message receiver or content screening requester. Embodiments of the present invention provide centralized screening service for different services and thus satisfy demands of different users for content.

3 Claims, 5 Drawing Sheets

FOREIGN PATENT DOCUMENTS

WO     WO 2005/119993     12/2005

OTHER PUBLICATIONS

State Intellectual Property Office of the People's Republic of China, English Translation of Written Opinion of the International Searching Authority in International Patent Application No. PCT/CN2007/070056 (Sep. 6, 2007).

Extended European Search Report, Application No./Patent No. 07721679.4-2413/1971076 PCT/CN2007/070056, dated May 3, 2010, 6 pages.

Communication pursuant to Article 94(3) EPC, Application No. 07721679.4-2413, dated Mar. 25, 2011, 4 pages.

Chinese Office Action, Application No. 200610138277.6, dated Apr. 26, 2011, 13 pages (partial English translation attached).

* cited by examiner

SYSTEM, APPARATUS AND METHOD FOR CONTENT SCREENING

This application claims priority to Chinese Patent Application No. 200610100874.X, filed Jul. 11, 2006, which is hereby incorporated by reference.

FIELD OF THE INVENTION

The present invention relates to the technology of screening content transmitted in the network, and particularly, to a system, apparatus and method for content screening for a mobile network.

BACKGROUND OF THE INVENTION

At present, mobile terminal users can enjoy more and more colorful mobile services with more and more powerful mobile terminals. However, such information as illegal messages, junk mails, mobile phone viruses and eroticism also comes along, disturbing the mobile terminal users. The mobile terminal users are increasingly eager to get rid of such information as mobile phone viruses and junk mails. Meanwhile, mobile operators also hope to protect their networks from attacks of the mobile phone viruses and junk mails, and provide, for the mobile terminal users subscribing in their networks, high quality services and further provide customized content screening service, so as to improve user experiences. The customized content screening service includes the following.

1) Parents require protection for underage children using mobile terminals from content relating to eroticism, violence and gamble.

2) Employers expect to guarantee that employees using mobile terminals will not get involved, via the mobile terminals during office hours, in Internet entertainment irrelevant to their jobs, e.g., online chatting, online games, online business and stream media download, etc.

3) The mobile terminal users require protection against cheating and befooling of charging servers, and wish to avoid personal information exposure or being charged in ignorance caconfigured by sending information by mistake, e.g., sending a short message.

4) Some high-end mobile terminal users hope to customize high-level protection against the viruses and junk information for mobile terminals.

Currently, different content screening apparatuses are designed for different services in the mobile network, fitting the characteristics of the services and configured for screening corresponding services. For example, a short message filter for screening sensitive texts is designed for a short message service, a multimedia message filter for screening eroticism and illegal graphics is designed for a multimedia message service, and there are also specific filters based on the Wireless Application Protocol (WAP). These filters are usually configured at the network side of a packet switched network managed by a mobile operator and are specific content oriented, however, these filters are designed for different services and cannot be shared with each other in general, and the mobile terminal users can not customize screening criteria according to their demands.

The inventor of the present invention finds that the conventional screening mechanism for the services has the following disadvantages: simple screening function without screening information sharing, i.e., a content screening apparatus for one service handles the service only and different content screening apparatuses are unable to share screening results and experiences; lack of customized service for the mobile terminal users, i.e., a service adopts unified screening criteria and no customized screening criteria based on the demands of the mobile terminal users are allowed; and screening leaks, i.e., when no content screening apparatus for a certain service is configured at the network side of the packet switched network managed by the mobile operator, viruses and junk information spreading via the service will damage the experience of the mobile terminal users, or even cause the network side to crash. Therefore, a content screening technique for protecting the mobile terminal users from accessing inappropriate content is needed to satisfy the demands of the mobile terminal users for content screening.

SUMMARY OF THE INVENTION

Embodiments of the present invention provide a content screening system, a content screening apparatus and a method for content screening, which screen traffics of different services in a centralized manner and satisfy demands of a mobile terminal user for content screening.

According to an embodiment of the present invention, a content screening system includes a message receiver; and a content screening apparatus, for screening content in a message to be received by the message receiver, and sending a screening result to the message receiver.

According to an embodiment of the present invention, a content screening system includes: a content screening requester, for sending a message containing content to be screened for screening; and a content screening apparatus, for screening the content from the content screening requester, and sending a screening result to the content screening requester.

According to an embodiment of the present invention, a content screening apparatus includes: a content screening server, for receiving a content screening request containing content to be screened or intercepting content to be screened, screening the content and sending a screening result to an entity requesting content screening or a receiver of the content.

According to an embodiment of the present invention, a content screening method includes: receiving a content screening request by a content screening server from a content screening requester; and screening content by the content screening server according to the content screening request, and sending a screening result to the content screening requester.

According to an embodiment of the present invention, a method for content screening for a mobile network includes: intercepting content from a content provider to a receiver by a content screening server; and screening the content by the content screening server and sending a screening result to the receiver.

It can be seen from the above technical scheme that the content screening apparatus provided by the embodiments of the present invention not only screens content in a centralized manner, but also allows customized screening of the content for the mobile terminal user according to screening criteria customized by the mobile terminal user subscribing to the content screening service for the mobile terminal. In addition, the content screening apparatus provided by the embodiments of the present invention in the mobile network is able to intercept content sent to the mobile terminal or screen the content on demands of the mobile terminal or other content screening requesters. Hence the embodiments of the present invention provide centralized screening service for different services and thus satisfy demands of different users for content screening.

DETAILED DESCRIPTION OF THE INVENTION

A detailed description of the embodiments of the present invention is provided hereinafter with reference to the accompanying drawings.

Figure 1:
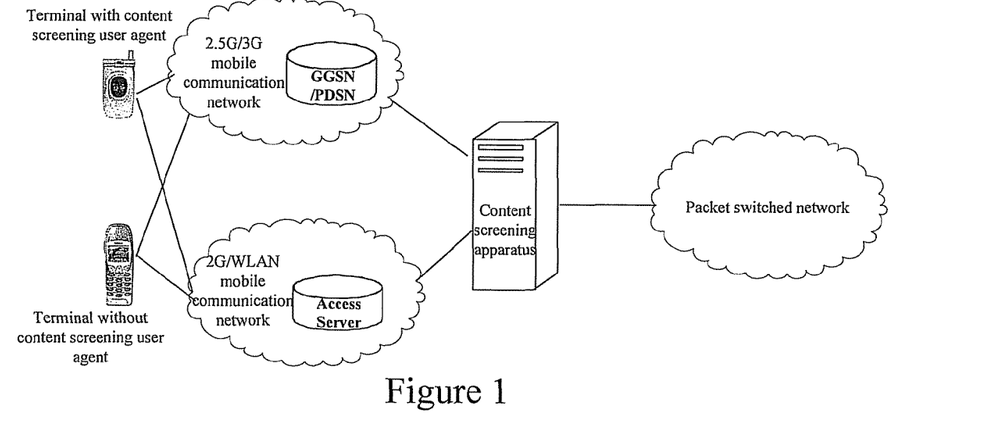
FIG. 1 is a schematic diagram of a content screening system provided in an embodiment of the present invention for a mobile network.

FIG. 1 is a schematic diagram of a content screening system provided in an embodiment of the present invention for a mobile network. As shown in FIG. 1, the content screening system includes a mobile terminal and a content screening apparatus. The content screening apparatus is configured between a mobile communication network and a packet switched network, for intercepting and screening a message containing content from the packet switched network and sending the screened message to the mobile terminal. Meanwhile, the mobile terminal may adopt a content screening user agent in the mobile communication network, and the content screening user agent enables the mobile terminal to send the message containing unscreened content to the content screening apparatus for screening. In this embodiment, the mobile terminal may function as a content screening requester requesting content screening, or as a message receiver receiving screened content.

In the embodiment, the mobile communication network may be a 2G, 2.5G or 3G network defined by $3^{rd}$ Generation Partnership Project (3GPP) or 3GPP2, or a mobile communication network accessed by a Wireless Local Area Network (WLAN). The packet switched network may be the Internet or the packet switched network managed by a mobile operator, etc. The packet switched network managed by a mobile operator includes various mobile service platforms, e.g., short message centers, multimedia message centers and WAP servers, etc.

In the embodiment of the present invention, the screening may include one or more of virus screening, anti-junk screening, anti-illegal-information screening and customized content screening of mobile terminal users. A result generated after the screening may include the screened content or a screening judgment result, e.g., when a content screening requester (including but not limited to a mobile terminal, a service engine or a proxy server) chooses to delete or display the screened content, the content screening apparatus or the mobile terminal will perform corresponding operation based on the choice of the content screening requester.

In the embodiment, the content screening user agent is an application of the mobile terminal, specifically, is content screening service provided by the mobile terminal. The content screening user agent can be set in the mobile terminal, and the content screening service provided by the mobile terminal includes the following:

first, subscription of a content screening service, including subscription of customized content screening criteria of the mobile terminal user, dynamic modification of the customized content screening criteria of the mobile terminal user which is subscribed, and confirmation of a subscription message; where the subscription of a content screening service may not be implemented by the content screening user agent, but be provided by business offices or Portals of operators of the content screening service;

second, when the unscreened content received at the mobile terminal are detected, the unscreened content shall be deleted, or a content screening request containing the unscreened content shall be initiated to the content screening apparatus, and the content screening apparatus screens the content and returns a screening result to the mobile terminal;

third, participation in confirmation and feedback activities of the content screening service, for example, when unable to determine whether certain content shall be intercepted, the content screening apparatus returns a default content processing result with an explanation message to the mobile terminal; in response to receiving an instruction sent by the mobile terminal via the content screening user agent, the content screening apparatus intercepts the content or sends the content to the mobile terminal; for another example, when the content screening apparatus sends content which should be intercepted to the mobile terminal by mistake, the mobile terminal sends a processing error message via the content screening user agent to the content screening apparatus, and the content screening apparatus improves the content screening function based on the processing error message in response to receiving the processing error message.

In the embodiment of the present invention, the content screening apparatus may screen the content to be sent to the mobile terminal (including the content from the Internet or from the packet switched network managed by the mobile operator) in two modes. One mode is to adopt active interception of the content, i.e., Proxy mode; the other mode is to screen the content when a certain requester request the screening, i.e., Callable mode. In the Proxy mode, the content screening apparatus intercepts all content passing through the mobile communication network, performs a public screening, and determines whether user customized content screening should be performed based on whether the mobile terminal user receiving the content is a content screening service subscriber. In the Callable mode, when the mobile terminal configured with the content screening user agent detects with the content screening user agent that the received content have not been screened by the content screening apparatus, the mobile terminal may send the received content to the content screening apparatus for screening. And the content not screened by the content screening apparatus may be received from an infrared interface, a Bluetooth interface, a WiFi interface or a portable storage media, or from the packet switched network.

Figure 2:
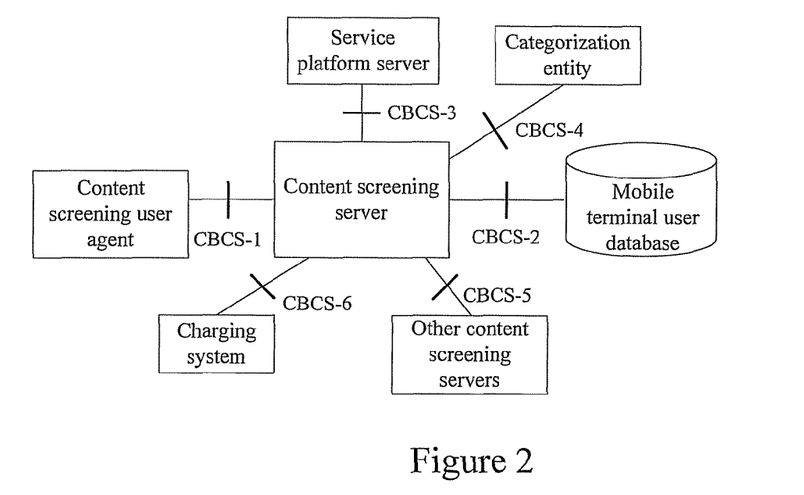
FIG. 2 is a schematic diagram illustrating the structure of a content screening apparatus provided in an embodiment of the present invention.

FIG. 2 is a schematic diagram illustrating the structure of the content screening apparatus provided in an embodiment of the present invention. As shown in FIG. 2, the content screening apparatus in this embodiment includes: a content screening server, a mobile terminal user database and a categorization entity. The mobile terminal user database and the categorization entity are connected to the content screening server respectively, and the content screening server is connected to a mobile terminal to provide a content screening service for the mobile terminal.

In the embodiment of the present invention, the content screening server provides two screening functions: centralized public content screening and user customized content screening. The centralized public content screening aims at virus screening, junk information and illegal information interception set by an operator in order to ensure the security of the mobile communication network or the packet switched network managed by the operator and further to provide high quality services for users. The user customized content screening aims at screening the content to be received by a mobile terminal according to the user customized content screening criteria to which the mobile terminal user subscribes. The content screening server is connected to all mobile service platforms and Internet application platforms, and all content from the Internet (e.g. emails, web pages, etc.) must be screened by the content screening server before being sent to the mobile terminal; meanwhile, short messages, multimedia messages and WAP applications managed by the mobile operator must be screened by the content screening server before being sent to the mobile terminal as well.

In the embodiment of the present invention, the mobile terminal user database stores service information related to the mobile terminal user, e.g., a content screening log, subscribed content screening criteria and interface information, etc.; and provides the service information to the content screening server when the content screening server screens the content to be sent to the mobile terminal in the manner of the user customized content screening.

The categorization entity correctly categorizes and/or grades the content from the content screening server or from a content/service provider so that the content screening server may filter the content better. The categorization entity may be a third party trusted by the content screening server and the categorizing mechanism of the categorization entity complies with rules and standards set by authorities. The categorization entity may also categorize and/or grade content according to a request from a content screening requester but not from the content screening server, and returns the categorized and/or graded content to the content screening requester.

In the embodiment of the present invention, the mobile service platforms and the Internet application platforms are generally referred to as service platform servers, including various service platform servers in a mobile network and Internet service platform servers. The service platform servers in the mobile network include short message centers, multimedia message centers, WAP gateways and Push gateways; and the Internet service platform servers include various content/service provider servers, Web servers, email servers and unified message servers. In the embodiment of the present invention, the content from the service platform servers are screened by the content screening server before being sent to a mobile terminal.

The content screening apparatus provided in the embodiment of the present invention may further include a charging system connected to the content screening server and configured to charge for the content screening. The charging system may adopt two charging modes: monthly charging mode and traffic-volume-based charging mode. When the traffic-volume-based charging mode is adopted, the content screening server generates and sends a content screening bill to the charging system, and the charging system charges, for the content screening according to the content screening bill from the content screening server. When the monthly charging mode is adopted, the content screening server does not generate the content screening bill.

In the embodiment of the present invention, the content screening server in the content screening apparatus may also be connected to other content screening servers.

Table 1 shows an interface between the content screening server in the embodiment of the present invention and a mobile terminal with the content screening user agent, or the mobile terminal user database, or a service platform server, or the categorization entity, or another content screening server, or the charging system.

TABLE 1

| Interface | Description |
| --- | --- |
| Categorization-Based Content Screening (CBCS-1) | The interface between a mobile terminal with the content screening user agent and the content screening server, mainly configured by the content screening user agent for subscribing to or invoking a content screening service, and receiving content screened by the content screening server. |
| CBCS-2 | The interface between the mobile terminal user database and the content screening server, mainly configured by the content screening server for invoking related user information, e.g., screening criteria to which a user subscribes, and for returning a screening log. |
| CBCS-3 | The interface between a service platform server and the content screening server; mainly configured by the content screening server for intercepting the content for screening. |
| CBCS-4 | The interface between the categorization entity and the content screening server, mainly configured by the content screening server for invoking a content categorizing/grading function. |
| CBCS-5 | The interface between different content screening servers, mainly configured for charging between providers of different content screening services and invoking home content screening service by a visited content screening server when a mobile terminal is roaming. |
| CBCS-6 | The interface between the charging system and the content screening server, mainly configured by the charging system for obtaining a content screening bill for charging. |

In an embodiment of the present invention, the content screening apparatus in the mobile network may only include the content screening server without any other entities. In this case, the content screening server receives a content screening request containing content to be screened or intercepts content to be screened, screens the content and sends a screening result to an entity requesting content screening or to a receiver of the content.

When the content screening request containing the content to be screened or the intercepted content to be screened has not been categorized and/or graded yet but needs to be categorized and/or graded, the content screening apparatus may further include a categorization entity for categorizing/grading the intercepted content to be screened or the content to be screened contained in the content screening request. The categorization entity in the content screening apparatus may also categorize and/or grade content from other requesters.

Figure 3:
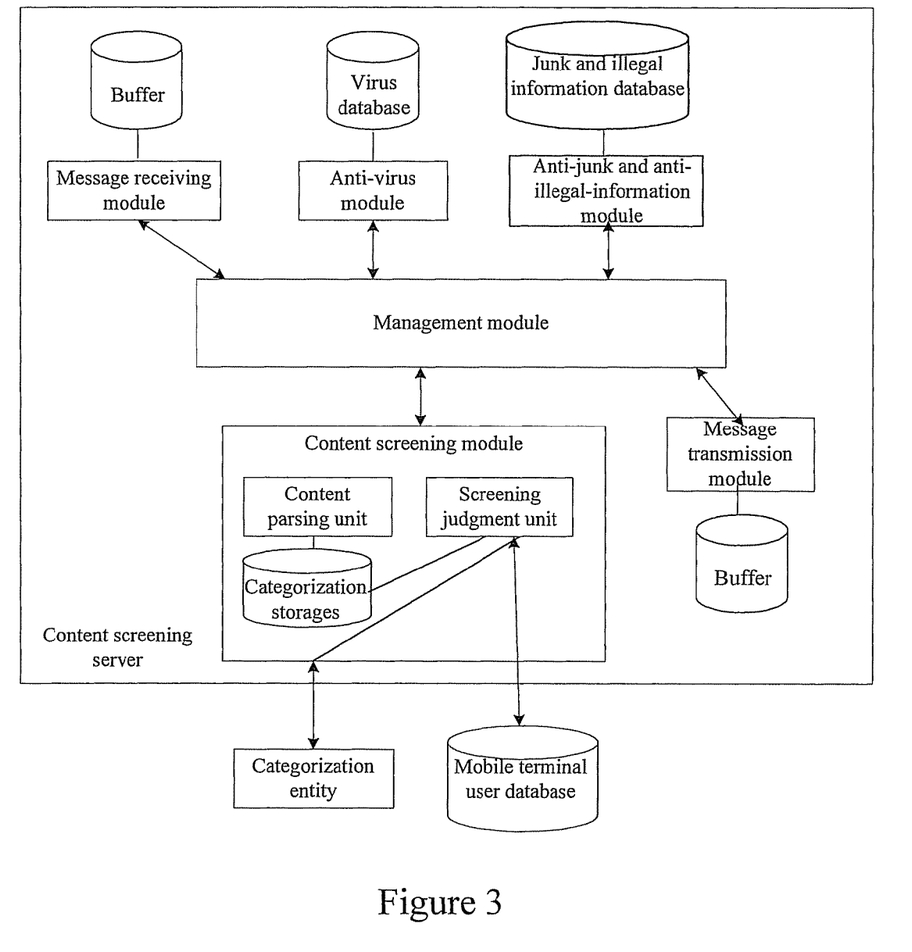
FIG. 3 is a schematic diagram illustrating the structure of a content screening server provided in an embodiment of the present invention.

FIG. 3 is a schematic diagram illustrating the structure of a content screening server provided in an embodiment of the present invention. As shown in FIG. 3, the content screening server includes a management module, a message receiving module, an anti-virus module, an anti-junk and anti-illegal-information module, a content screening module and a message transmission module.

The management module obtains content to be screened from the message receiving module, instructs the anti-virus module, the anti-junk and anti-illegal-information module and the content screening module to process the content, generates a final screening result based on an anti-virus result from the anti-virus module, an anti-junk and anti-illegal-information result from the anti-junk and anti-illegal-information module and a content screening result from the content screening module, and sends the final screening result to the message transmission module.

The message receiving module, including a buffer, receives and parses a message to obtain the content to be screened. The message may be sent by a mobile terminal with the content screening user agent and contain content or content features; or the message may be intercepted by the content screening server from a service platform server and contain content. The message receiving module determines, according to the processing status of the management module, whether to buffer the parsed content in the buffer for waiting to be processed.

The anti-virus module, including a virus database, scans, identifies and screens viruses in the content according to an instruction from the management module, and sends the anti-virus result to the management module. The anti-virus module may scan and kill viruses in two manners to provide the virus screening service in different levels. In one manner, the content is compared with the virus features in the virus database so that known viruses may be screened out. In another manner, possible new viruses, e.g., variants of known viruses, are found and screened out through heuristics. The virus screening service provided by the operator may usually screen out known viruses, and the virus database may be maintained by a third party which regularly updates and manages the virus database in a centralized manner.

The anti-junk and anti-illegal-information module, including a junk and illegal information database, screens out the junk information and the illegal information from the content with a determined manner according to the instruction from the management module, e.g., blacklist, address analysis, header analysis, keyword screening, etc., and sends an anti-junk and anti-illegal-information result to the management module. The junk and illegal information database stores the features of known junk and illegal information, including domain names, IP addresses and blacklists, etc. The illegal information refers to content of hidden threats to national security and society stability, e.g., extreme violence information and illegal gamble information. The illegal information is set by the government/operator, and the junk and illegal information database can be maintained by a third party and updated in real time.

The content screening module screens content based on the instruction from the management module according to both the categorizing and/or grading result of the content and the screening criteria to which the mobile terminal user subscribes. The screening criteria is from the mobile terminal user database outside the content screening server, and the categorizing and/or grading result is generated by the categorization entity outside the content screening server. Furthermore, the content screening module saves the content screening log in the mobile terminal user database outside the content screening server and sends the screening result to the management module.

The message transmission module, including a buffer, encapsulates the final screening result from the management module and sends the encapsulated final screening result to the mobile terminal which should receive the message.

In the embodiment of the present invention, the mobile terminal user database may be integrated in the content screening server, which is different from the mobile terminal user database outside the content screening server in that: the information stored in the integrated mobile terminal user database is configured in the content screening server and the content screening service is managed totally by the mobile operator, no third party is allowed to provide the content screening service in such situation. Therefore the definitions of interfaces in the architecture of the content screening service are reduced (the CBCS-2 interface is omitted), and the speed of screening is increased because the process of invoking the mobile terminal user information is also omitted.

Similarly, the categorization entity may also be integrated into the content screening server in an embodiment of the present invention. In such a case, the CBCS-4 interface will be an internal interface in the content screening server.

Figure 4:
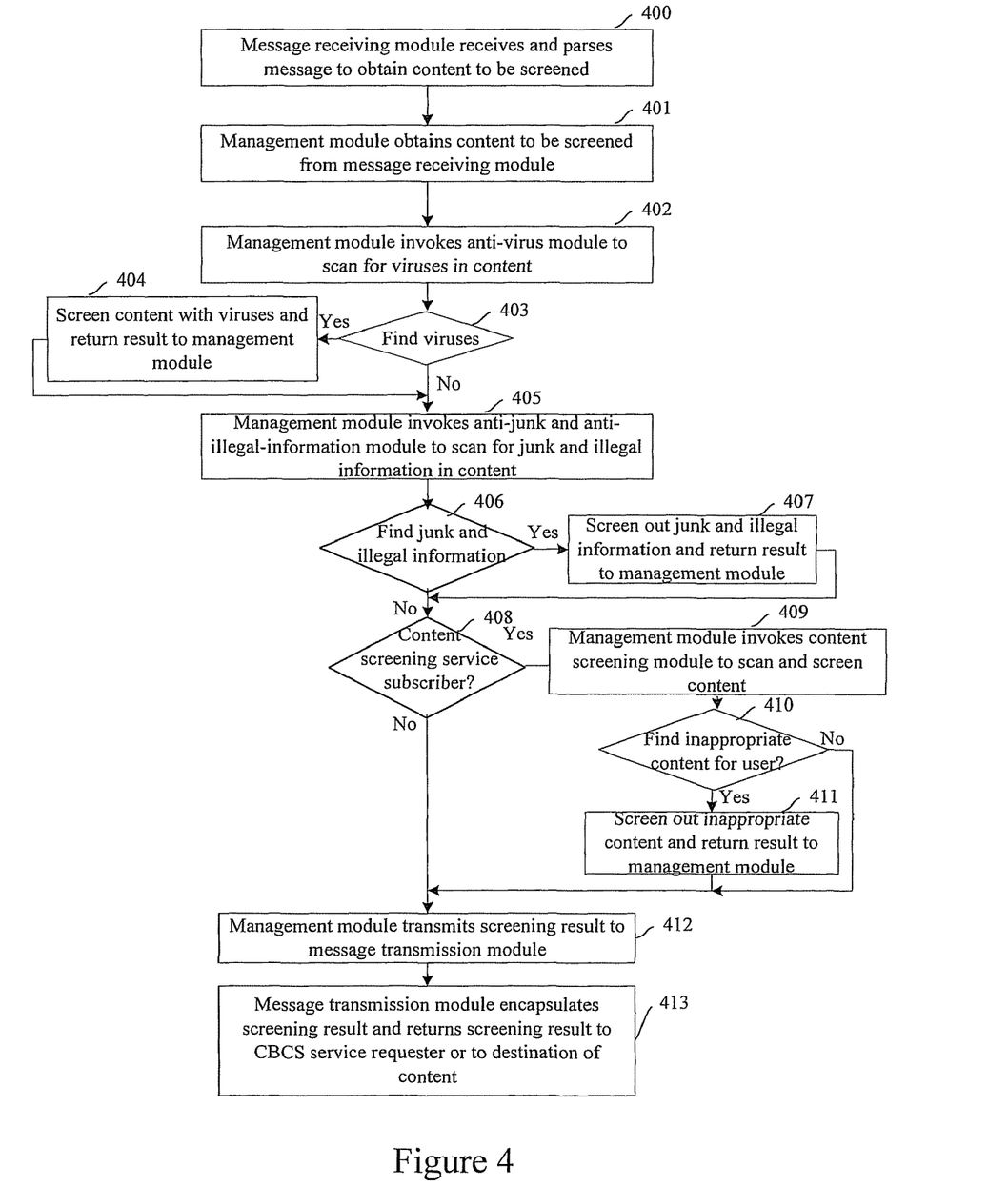
FIG. 4 is a flow chart illustrating the content screening server processing a message in accordance with an embodiment of the present invention.

FIG. 4 is a flow chart illustrating the content screening server processing a message in accordance with an embodiment of the present invention, including:

Block 400: the message receiving module receives a message and parses the message to obtain the content to be screened.

Block 401: the management module obtains the content to be screened from the message receiving module.

Block 402: the management module invokes the anti-virus module to screen viruses in the content.

Block 403: the anti-virus module performs virus scanning based on the virus features in a virus database and determines whether a virus is found; if a virus is found, Block 404 is performed, otherwise Block 405 is performed.

Block 404: the anti-virus module screens the content with viruses, returns an anti-virus result to the management module; and Block 405 is performed.

Block 405: the management module invokes the anti-junk and anti-illegal-information module to screen junk and illegal information in the content.

Block 406: the anti-junk and anti-illegal-information module performs junk and illegal information scanning based on the known junk and illegal information features in the junk and illegal information database and determines whether junk and/or illegal information is found; if junk and/or illegal information is found, Block 407 is performed, otherwise Block 408 is performed.

Block 407: the anti-junk and anti-illegal-information module screens out the junk and illegal information, returns an anti-junk, and anti-illegal-information result to the management module; and Block 408 is performed.

Block 408: the management module accesses the mobile terminal user database and determines whether the mobile terminal that should receive the message containing the content has subscribed to the content screening service; if the mobile terminal has subscribed to the content screening service, Block 409 is performed, otherwise Block 412 is performed.

Block 409: the management module invokes the content screening module to screen the content.

Block 410: the content screening module detects whether the content contains information not complying with the user customized content screening criteria; if the content contains such information, Block 411 is performed; otherwise Block 412 is performed; the user customized content screening criteria are obtained by the content screening module from the mobile terminal user information in the mobile terminal user database.

Block 411: the content screening module screens out the information not complying with the user customized content screening criteria, and returns a content screening result to the management module.

Block 412: the management module generates a final screening result based on the anti-virus result, the anti-junk and anti-illegal-information result and the content screening result, and sends the final screening result to the message transmission module.

Block 413: the message transmission module encapsulates the final screening result and returns the encapsulated final screening result to the mobile terminal that should receive the message containing the content.

In the embodiment of the present invention, the content screening module may include a content parsing unit, a categorization storage and a screening judgment unit.

The content parsing unit parses the content, based on the type of the content from the management module, preliminarily into texts, graphics, audios, videos, stream media and links, etc., and sends different categories of parsed content to corresponding categorization storages respectively for storage. The categorization storages invoke the categorization entity to categorize and/or grade the content stored in the categorization storages and send a categorizing/grading result to the screening judgment unit. The screening judgment unit analyzes the content based on the categorizing/grading result and the user customized screening criteria to generate a content screening result, e.g., the screening judgment unit analyzes the content to determine whether to send/intercept/partially intercept the content. Partially intercepting the content indicates intercepting only a part of the content, e.g., in a web page, the texts are healthy but the graphics and links are unhealthy, therefore only the graphics and links are screened out. If required, the screening judgment unit may send the content screening log to the mobile terminal user database for storage.

Figure 5:
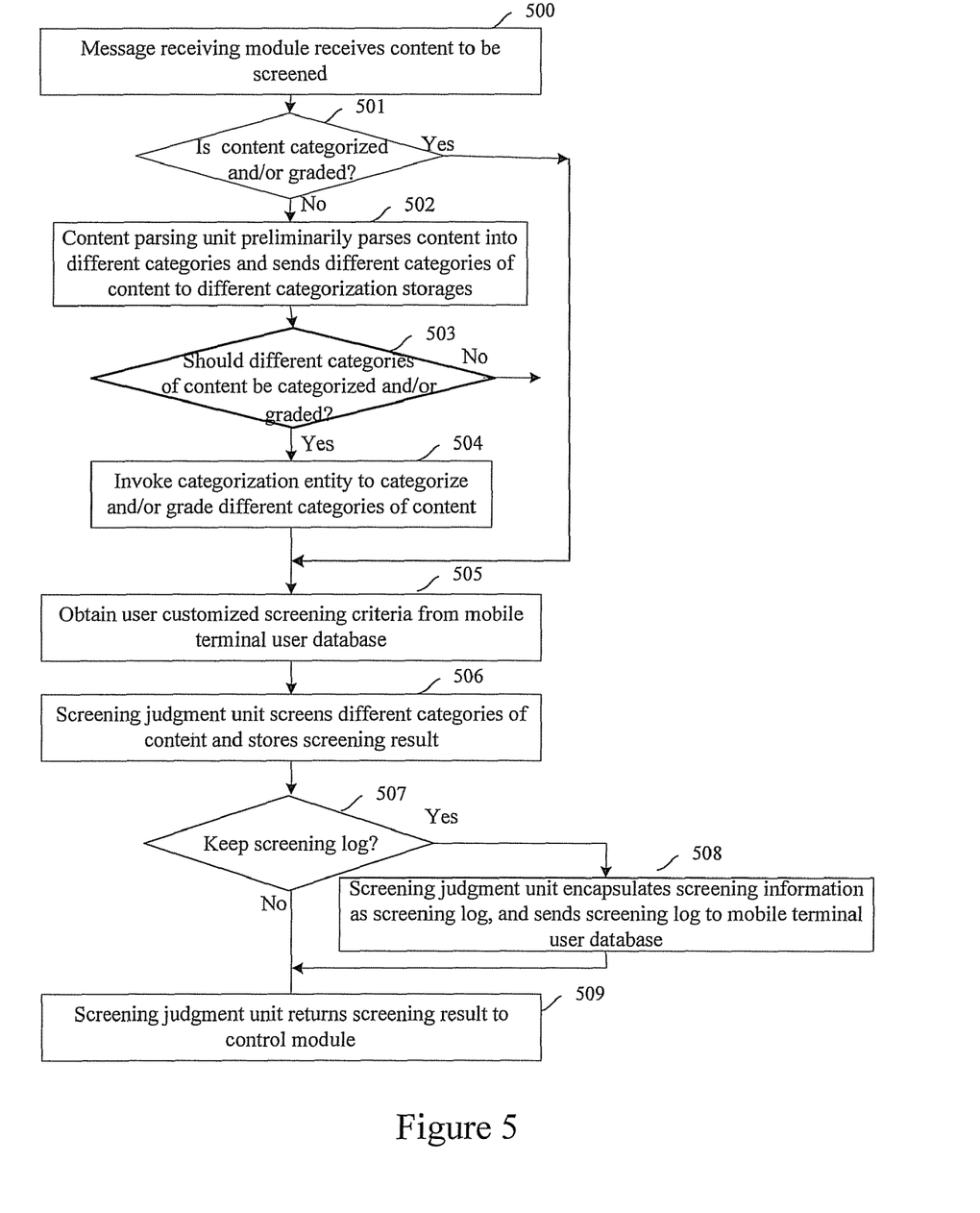
FIG. 5 is a flow chart illustrating the process of content screening inside a content screening module in accordance with an embodiment of the present invention.

FIG. 5 is a flow chart illustrating the process of content screening inside the content screening module in accordance with an embodiment of the present invention, including:

Block 500: the content parsing unit in the content screening module receives content to be screened from the management module.

Block 501: the content parsing unit determines whether the content has been categorized and/or graded; if the content has been categorized and/or graded, Block 505 is performed; otherwise Block 502 is performed.

Block 502: the content parsing unit parses the content preliminarily into different categories and sends different categories of parsed content to corresponding categorization storages respectively.

Block 503: the categorization storages determine whether the different categories of parsed content received needs to be categorized and/or graded, if the content needs to be categorized and/or graded, Block 504 is performed; otherwise Block 505 is performed.

Block 504: the categorization storages invoke the categorization entity to categorize and/or grade the different categories of parsed content, and Block 505 is performed.

Block 505: the categorization storages send the different categories of content after categorized and/or graded to the screening judgment unit, and the screening judgment unit obtains the user customized content screening criteria from the mobile terminal user database.

Block 506: the screening judgment unit screens the different categories of content according to the user customized content screening criteria and generates a content screening result.

Block 507: the screening judgment unit determines whether to keep the screening log; if the screening log shall be kept, Block 508 is performed, otherwise Block 509 is performed.

Block 508: the screening judgment unit encapsulates the screening log, sends the encapsulated screening log to the mobile terminal user database and Block 509 is performed.

Block 509: the screening judgment unit returns the content screening result to the management module.

An embodiment of the present invention also provides a method for content screening for a mobile network, and the method for content screening may be performed in two modes based on whether the content screening server is passively invoked or actively intercepts content, namely, a Callable mode or a Proxy mode. In an embodiment of the present invention, the process of content screening is based on content categorizing and/or content grading, therefore in both of the two modes, at least two entities are involved: the content screening server and the categorization entity. The processes of content screening in the two modes are described respectively below.

Figure 6:
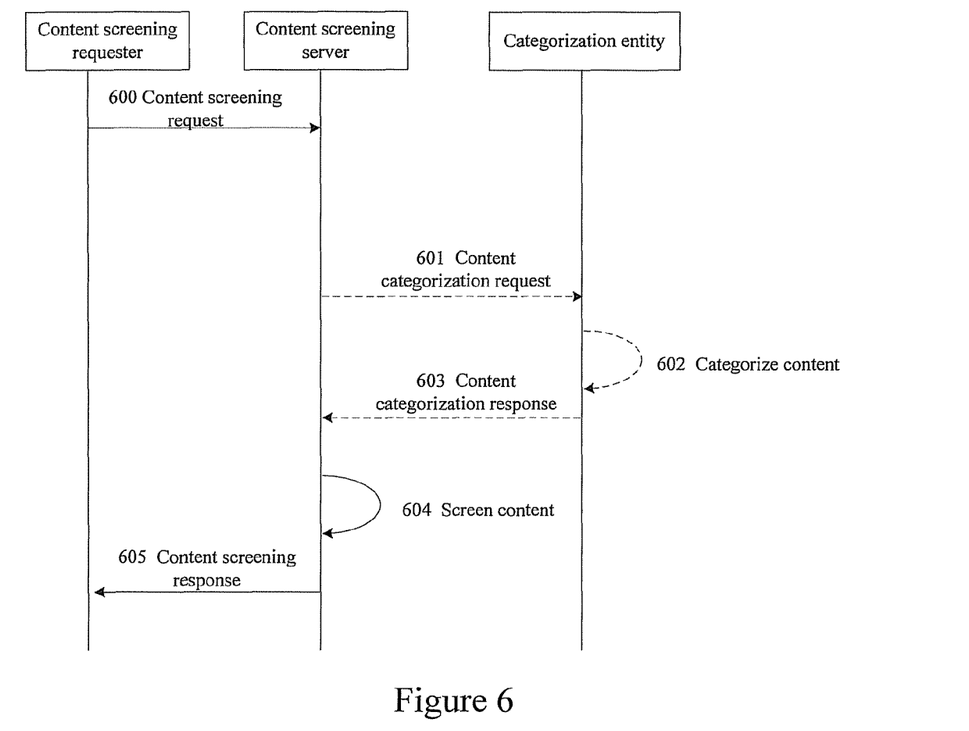
FIG. 6 is a flow chart illustrating the process of content screening in a Callable mode in an embodiment of the present invention.

The process of content screening in the Callable mode is described first.

FIG. 6 is a flow chart illustrating the process of content screening in the Callable mode in an embodiment of the present invention. The entities for performing the process include the content screening requester, the content screening server and the categorization entity, and the process is described below.

Block 600: the content screening requester sends a content screening request to the content screening server to request content screening service, the content screening request may contain the content to be screened, e.g., text files, web pages, emails or links.

In this embodiment, the content screening requester may be a mobile terminal with content screening user agent, or a service engine, or a proxy server, or other requesters.

Block 601: the content screening server sends a content categorization request to the categorization entity to request content categorizing and/or grading service, the content categorization request contains the content to be categorized and/or graded.

The content screening server may send multiple content categorization requests to multiple categorization entities, each of the content categorization requests contains a category of the content parsed preliminarily from a categorization storage.

Before Block 601, the method further includes: performing preparation and preliminary processing by the content screening server in response to receiving the content screening request, for example, parsing the content screening request to obtain the content to be screened and determining whether to perform the customized content screening of the mobile terminal user.

When the customized content screening of the mobile terminal user is to be performed, the content to be screened is first parsed into texts, graphics, audios, videos, stream media and links, which are stored in different categorization storages of the content screening module. In addition, the parsed content may additionally contain categorizing and/or grading information provided by a reliable third party. In such a case, the content screening server also has to parse the additional information.

Block 602: the categorization entity receives and parses the content categorization request to obtain the content within the content categorization request, and categorizes and/or grades the content with an algorithm or according to a set of criteria.

Accordingly, when the content screening server sends multiple content categorization requests to multiple categorization entities, the categorization entities may cooperate simultaneously to speed up the processing in Block 601 and Block 602. The categorization entities may also work separately, e.g., a categorization entity may be dedicated to text processing while another categorization entity is dedicated to graphic processing, which facilitates appropriate work division among the categorization entities and further speeds up the processing. In addition, the algorithm and criteria adopted by the categorization entities have to comply with the standards set by national authorities and/or operators, e.g., the definition of eroticism graphics, the grading standards for eroticism graphics based on the parts and proportion of naked body, etc.

Block 603: the categorization entity returns a content categorization response, which contains a content categorizing and/or grading result, to the content screening server.

Block 604: according to the content categorizing and/or grading result, or according to the categorizing and/or grading information provided by a reliable third party and included in the content, which is possibly in combination with the customized content screening criteria of the mobile terminal user, the content screening server analyzes and processes the categorized and/or graded content, and screens the content to obtain a content screening result.

The customized content screening criteria of the mobile terminal user is obtained from the mobile terminal user database.

Block 605: the content screening server returns the content screening result to the content screening requester.

The content screening result includes the screened content and the reason for intercepting the content. Or the content screening result includes a message to be confirmed by the user, e.g., when the content screening server is unable to determine whether to intercept certain content, the content screening server returns a default content processing result with an explanation message to the mobile terminal user; after the mobile terminal user confirms the default content processing result, the content screening server determines whether to provide the content to the mobile terminal user.

In an embodiment of the present invention, when the content to be screened has already been categorized and/or graded, or when the content need not be categorized or graded, Block 601 may be omitted, i.e., Block 601 is optional. Accordingly Blocks 602 and 603 are also optional. In this condition, the process of content screening in the Callable mode includes: receiving a content screening request by the content screening server from the content screening requester, screening the content according to the content screening request and returning the content screening result to the content screening requester.

Figure 7:
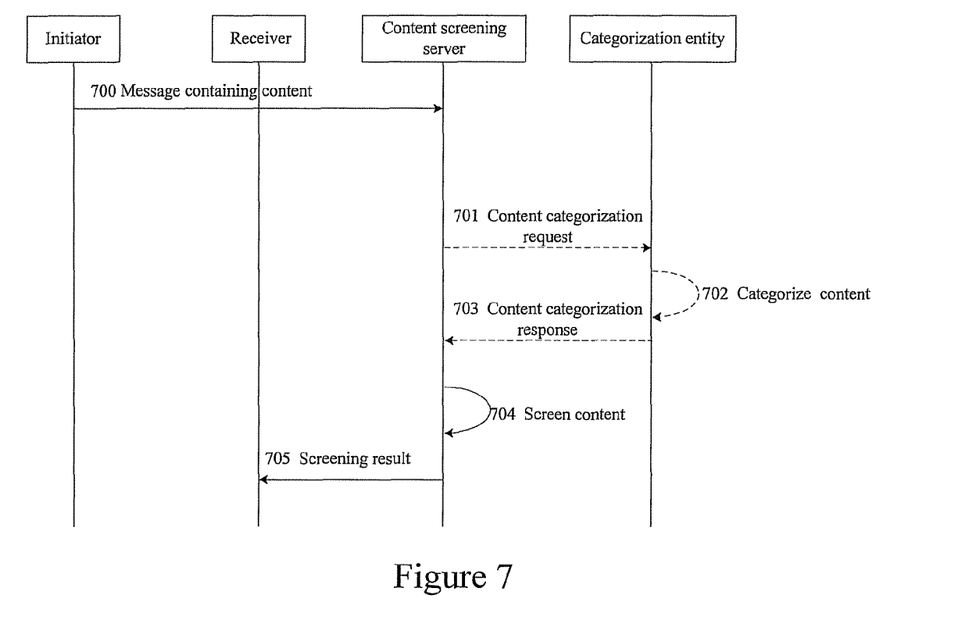
FIG. 7 is a flow chart illustrating the process of content screening in a Proxy mode in an embodiment of the present invention.

The process of content screening in the Proxy mode is described below.

In the Proxy mode, the process of content screening involves two entities: message initiator and message receiver. The message initiator may be a service platform server and the corresponding message receiver is a mobile terminal; or the message initiator may be a mobile terminal, and the corresponding message receiver is a service platform server or another mobile terminal with or without content screening user agent.

FIG. 7 is a flow chart illustrating the process of content screening in the Proxy mode in accordance with an embodiment of the present invention, and the process of content screening is described below.

Block 700: the message initiator sends a message containing content to be screened.

Block 701: the content screening server sends a content categorization request to the categorization entity to request content categorizing/grading service, and the content categorization request contains the content to be categorized and/or graded.

Before Block 701, the method further includes: intercepting and parsing the message by the content screening server and determines whether the content contained in the message should be screened.

The content screening server parses the message to obtain the message initiator and the message receiver, and determines whether the message receiver and/or initiator is a content screening service subscriber. If the message receiver is a content screening service subscriber, the content screening server carries out corresponding preparation and preliminary processing, including parsing the message to obtain the content to be screened and determining whether the content should be screened. If the message initiator is a content screening service subscriber, it is checked whether the address of the message receiver is an address which should be intercepted according to the predetermined user customized content screening criteria, or whether the address of the message receiver is a deceiving and charging address, or whether the content of the message will be charged or cause security threats. If neither the message initiator nor the message receiver is a content screening service subscriber, the content screening server just screens out viruses, junk and illegal information from the content.

Block 702: in response to receiving the content categorization request, the categorization entity parses the content categorization request to obtain the content to be screened, and categorizes and/or grades the content with an algorithm or according to a set of criteria.

Block 703: the categorization entity returns a content categorization response, which contains a content categorizing and/or grading result, to the content screening server.

Block 704: according to the content categorizing and/or grading result, or according to the categorizing and/or grading information provided by a reliable third party and included in the content, which is possibly in combination with the customized content screening criteria of the mobile terminal user, the content screening server processes the content to be screened.

Block 705: the content screening server sends the screened content to the message receiver, and the content screening server may further send to the mobile terminal the reason why the content are intercepted if all or a part of the content are intercepted; or the content screening server may send a message to be confirmed by the mobile terminal user.

In an embodiment of the present invention, when the content to be screened has already been categorized and/or graded, or when the content to be screened need not be categorized or graded, Block 701 may be omitted, i.e., Block 701 is optional. Accordingly Blocks 602 and 603 are also optional. In this situation, the process of content screening in the Proxy mode includes: intercepting content sent by a content provider to a receiver by the content screening server, screening the content by the content screening server and returning a content screening result to the receiver.

According to an embodiment of the present invention, the process of content screening in the Proxy mode is described hereafter, supposing that the mobile terminal is a mobile phone which surfs on the Internet. In the process, the content screening server screens out the content in web pages that is not suitable for the mobile terminal user.

(1) A user opens a mobile phone web browser, enters www.sina.com.cn in the web browser, and enters the user name of "Aladdin" and the password of "open sesame".

(2) The content screening server obtains, through the CBCS-3 interface, a web page request initiated by the web browser of the user to the website Sina.com. The format of the request is as follows:

```
GET /index.html HTTP/1.1
Host: www.sina.com.cn
Proxy-Authorization: Basic QWxhZGRpbjpvcGVuIHNlc2FtZQ==
```

(3) The content screening server obtains the user name and the password according to the credential of the user and determines whether the user is a content screening service subscriber. If the user is a content screening service subscriber, (4) is performed, otherwise (5) is performed.

(4) The content screening server screens the link address of www.sina.com.cn, determines whether the website is a deceiving, illegal or unsecured website, or whether the address of the website is an address to be intercepted based on the user customized screening criteria; if the website is deceiving, illegal or unsecured, or if the address of the website is an address to be intercepted based on the user customized screening criteria, the content screening server refuses to forward the web page request and returns an explanation message to the user; if the link address is acceptable, the content screening server forwards the web page request and (5) is performed.

(5) The target website processes the web page request and returns content of the web page to the user through the content screening server. The response from the website is as follows:

```
HTTP/1.1 200 OK
Content-Type: application/html;charset= "utf-8"
Content-Length: 2048
   <!DOCTYPE HTML PUBLIC "-//W3C//DTD HTML 4.0
   Transitional//EN">
<!-- saved from url=(0021)http://www.baidu.com/ -->
<!-- saved from url=(0022)http://Internet.e-mail -->
<HTML><HEAD><TITLE>Sina.com</TITLE>
<script>...</script >
<BODY>...
...href="http://photo.sina.com/photo1.jpg
...href="http://photo.sina.com/video1.avi
...href="http://article.sina.com/article1.txt
...href="http://article.sina.com/audio1.mp3
...
</BODY>
</HTML>
```

The content of the web page includes graphics, videos, audios and texts.

(6) The content screening server carries out corresponding processing for the content of the web page based on whether the user is a content screening service subscriber. If the user is a content screening service subscriber, the content of the web page is sent to different categorization storages and interface CBCS-4 is invoked to send categorizing and/or grading request(s) for different categories of the content of the web page (i.e., photo 1, video 1, audio 1 and article 1). Meanwhile, the user customized content screening criteria are obtained through interface CBCS-2, and whether the content should be intercepted is determined according to the user customized content screening criteria. If the user is not a content screening service subscriber, the content screening server simply screens out viruses, junk and illegal information.

An example of the user customized content screening criteria is provided below:

```
<?xml version="1.0"?>
<rdf: RDF xmlns: rdf="http://www.w3.org/1999/02/22-rdf-syntax-ns#"
    xmlns: picture="http://www.w3.org/exam/PIC#">
    <picture: Person rdf: about="http://www.w3.org/exam/PIC#***">
    <picture: type>JPG</ picture: type>
    <picture: forcelevel >4</ picture: forcelevel>
    <picture: eroticismlevel >3</ picture: eroticismlevel>
    </picture: Person>
    ......
</rdf: RDF>
```

It can be seen from the example above that the user customized content screening criteria provide criteria including "pictures of forcelevel at and above 4 are forbidden" and "pictures of eroticismlevel at and above 3 are forbidden". The content screening server intercepts the pictures of force and eroticism according to the criteria and returns an alert to the user, explaining the reason why the content are intercepted.

(7) The content screening server sends the screened content to the user.

In the embodiment of the present invention, the content screening apparatus is configured at the egress of the mobile communication network, which protects networks managed by a mobile operator from viruses, junk mails and illegal information of external networks, improves the service quality of the mobile operator and thus wins potential mobile terminal users for the mobile operator. Furthermore, with the content screening apparatus configured unifiedly at the egress of the mobile communication network, it is not necessary to configure a content screening apparatus on every service platform and thus the cost is reduced.

According to the embodiments of the present invention, a new mobile service is created, which provides different content screening criteria to satisfy the demands of different mobile terminal users while bringing extra profits for mobile operators.

The content screening server and mobile terminal user database provided in the embodiments of the present invention may be configured separately, which makes it convenient for mobile operators to make content screening service provided by a third party and guarantees the security of the information of the mobile terminal users subscribing to the content screening service.

The content screening server and the categorization entity provided in the embodiments of the present invention may be configured separately, which facilitates the distribution arrangement of the two network entities. Therefore, a content screening entity may invoke multiple categorization entities to speed up the process of content screening; and multiple entities with the screening function provided in the embodiments of the present invention may be configured in the network.

The foregoing are only preferred embodiments of the present invention and are not for use in limiting the present invention, any modification, equivalent replacement or improvement made under the spirit and principles of the present invention is included in the protection scope thereof.

What is claimed is:

1. A content screening system, comprising:

a content screening requester, for sending a content screening request containing content to be screened for screening; and a content screening apparatus, for receiving the content screening request from the content screening requester, screening the content according to the content screening request, and sending a screening result to the content screening requester;

wherein the content screening apparatus comprises a categorization entity and a content screening server;

wherein the categorization entity is configured for categorizing and/or grading the content from the content screening server or from a categorizing and/or grading requester, generating a categorizing and/or grading result, and sending the categorizing and/or grading result to the content screening server or to the categorizing and/or grading requester;

the content screening server is configured for screening the content according to the categorizing and/or grading result from the categorization entity or from the categorizing and/or grading requester, generating the screening result, and sending the screening result to the content screening requester;

wherein the content screening system further comprises a mobile terminal user database, for sending user customized screening criteria stored in mobile terminal user database to the content screening server, and storing a screening log from the content screening server;

wherein the content screening server is further configured for screening the content according to the user customized screening criteria from the mobile terminal user database in response to screening out viruses, junk and illegal information from the content, and sending the screening log to the mobile terminal user database.

2. A content screening apparatus for a mobile network, comprising:

a content screening server, for receiving a content screening request containing content to be screened or intercepting content to be screened, screening the content according to the content screening request and sending a screening result to an entity requesting content screening or a receiver of the content;

a categorization entity, for categorizing and/or grading the content from the content screening server or from a categorizing and/or grading requester, generating a categorizing and/or grading result and sending the categorizing and/or grading result to the content screening server or the categorizing and/or grading requester, wherein the content screening server is configured for screening the content according to the categorizing and/or grading result from the categorization entity or from the categorizing and/or grading requester and generating the screening result;

a mobile terminal user database, for sending user customized screening criteria stored in the mobile terminal user database to the content screening server, and storing a screening log from the content screening server, wherein the content screening server is further configured for screening the content according to the user customized screening criteria from the mobile terminal user database in response to screening out viruses, junk and illegal information from the content, and sending the screening log generated to the mobile terminal user database;

wherein the content screening server comprises:

a message receiving module, a management module, an anti-virus module, an anti-junk and anti-illegal-information module, a content screening module and a message transmission module; wherein the message receiving module is configured for parsing the content intercepted by itself or the content in the content screening request, and sending parsed content to the management module:

the management module is configured for obtaining the content from the message receiving module, instructing the anti-virus module, the anti-junk and anti-illegal-information module and the content screening module to screen the content, generating the screening result based on an anti-virus result from the anti-virus module, an anti-junk and anti-illegal-information result from the anti-junk and anti-illegal-information module and a content screening result from the content screening module, and sending the screening result generated by the management module to the message transmission module;

the anti-virus module is configured for scanning, identifying and screening out viruses in the content based on virus samples according to an instruction from the management module, and sending the anti-virus result to the management module;

the anti-junk and anti-illegal-information module is configured for screening out junk and illegal information in the content based on known junk and illegal information features according to an instruction from the management module, and sending the anti-junk and anti-illegal-information result to the management module;

the content screening module is configured for screening the content based on the categorizing and/or grading result and the user customized screening criteria according to an instruction from the management module, sending the content screening result to the management module and the screening log to the mobile terminal user database; and the message transmission module is configured for sending the screening result from the management module to the entity requesting content screening or the receiver of the content.

3. The apparatus of claim 1, wherein the message receiving module comprises a buffer for buffering the content to be screened;

the anti-virus module comprises a virus database for storing the virus samples;

the anti-junk and anti-illegal-information module comprises a junk and illegal information database, for storing the know junk and illegal information features; and the message transmission module comprises a buffer, for buffering the screening result to be sent.

* * * * *

UNITED STATES PATENT AND TRADEMARK OFFICE
CERTIFICATE OF CORRECTION

PATENT NO.        : 8,055,241 B2                              Page 1 of 1
APPLICATION NO.   : 11/775653
DATED             : November 8, 2011
INVENTOR(S)       : Zhao et al.

It is certified that error appears in the above-identified patent and that said Letters Patent is hereby corrected as shown below:

In Col. 16, line 49, claim 3, delete "claim 1" and insert --claim 2--.

Signed and Sealed this
Twenty-fourth Day of April, 2012

David J. Kappos
*Director of the United States Patent and Trademark Office*